(12) United States Patent
Uchida et al.

(10) Patent No.: US 8,789,479 B2
(45) Date of Patent: Jul. 29, 2014

(54) OXYGEN MIXER FOR OXYGEN COMBUSTION BOILER

(75) Inventors: Terutoshi Uchida, Tokyo (JP); Toru Ishii, Tokyo (JP); Toshihiko Yamada, Tokyo (JP); Shuzo Watanabe, Tokyo (JP); Yoshiyuki Iso, Tokyo (JP)

(73) Assignee: IHI Corporation, Tokyo (JP)

( * ) Notice: Subject to any disclaimer, the term of this patent is extended or adjusted under 35 U.S.C. 154(b) by 99 days.

(21) Appl. No.: 13/505,806

(22) PCT Filed: Nov. 2, 2010

(86) PCT No.: PCT/JP2010/006451
§ 371 (c)(1),
(2), (4) Date: May 3, 2012

(87) PCT Pub. No.: WO2011/055528
PCT Pub. Date: May 12, 2011

(65) Prior Publication Data
US 2012/0227644 A1    Sep. 13, 2012

(30) Foreign Application Priority Data

Nov. 9, 2009  (JP) ................................. 2009-255963

(51) Int. Cl.
*F23B 80/02* (2006.01)
*F23C 9/00* (2006.01)

(52) U.S. Cl.
USPC .......................................... 110/205; 110/304

(58) Field of Classification Search
CPC ............ B01F 3/02; B01F 5/04; B01F 5/0401; B01F 5/0403; B01F 5/045; B01F 5/0461; B01F 5/0463; Y02E 20/344; Y02E 20/322; F23L 7/007; F23L 2900/07001; F23L 2900/07005; F23C 2202/30; F23C 2900/09002; F23C 9/00; F23G 2900/00001
USPC .......................... 110/304, 204, 205, 206, 207
See application file for complete search history.

(56) References Cited

U.S. PATENT DOCUMENTS

| | | | |
|---|---|---|---|
| 4,205,630 A * | 6/1980 | Regan | 110/304 |
| 2009/0293782 A1 * | 12/2009 | Eriksson et al. | 110/205 |
| 2011/0014578 A1 | 1/2011 | Rohde et al. | |

FOREIGN PATENT DOCUMENTS

| | | |
|---|---|---|
| JP | 3-291406 | 12/1991 |
| JP | 5-212258 | 8/1993 |
| JP | 10-165769 | 6/1998 |
| JP | 2007-147162 | 6/2007 |
| WO | WO 2009/110033 A1 | 9/2009 |

OTHER PUBLICATIONS

International Search Report issued Dec. 7, 2010 in PCT/JP2010/006451.

* cited by examiner

*Primary Examiner* — Kenneth Rinehart
*Assistant Examiner* — David J Laux
(74) *Attorney, Agent, or Firm* — Oblon, Spivak, McClelland, Maier & Neustadt, L.L.P.

(57) ABSTRACT

In an oxygen mixer for an oxygen combustion boiler, circulating exhaust gas heated in a rotary preheater is mixed with oxygen. Resultant mixed gas is guided to a boiler furnace through a combustion gas duct having bends. At the bend closest to the rotary preheater in the combustion gas duct, an oxygen injection nozzle is arranged to have a plurality of injection ports for injection of oxygen into circulating exhaust gas.

7 Claims, 5 Drawing Sheets

US 8,789,479 B2

OXYGEN MIXER FOR OXYGEN COMBUSTION BOILER

TECHNICAL FIELD

The present invention relates to an oxygen mixer for an oxygen combustion boiler.

BACKGROUND ART

In a conventional pulverized-coal fired boiler in practical use where coal (pulverized coal) is burned with air taken from an atmosphere with a blower, control is made for safe and stable combustion of the coal with the air having an oxygen concentration of about 21% (v/v). Meanwhile, nowadays, global warming suppression calls for urgent attention, which leads to rapidly increasing requests for reducing emissions of carbon dioxide ($CO_2$) discharged together with exhaust gas from the combustion of the coal.

Heat efficiency has been improved in the conventional pulverized-coal fired boiler so as to suppress fuel consumption per energy unit and thus emissions of $CO_2$. However, recent requests for reducing the emissions of $CO_2$ are impossible to meet only by such improvement in efficiency.

Thus, techniques have been developed which remove $CO_2$ from exhaust gas and isolate the removed $CO_2$ for prevention of dispersion thereof to atmosphere. An oxygen combustion boiler has been conceived in this connection.

Specifically, it has been conceived that oxygen ($O_2$) with a concentration of nearly 100% resulting from separation of nitrogen ($N_2$) from air is fed in place of combustion air to a pulverized-coal fired boiler, which drastically reduces $N_2$ in the exhaust gas from combustion of coal to theoretically make the exhaust gas have a $CO_2$ concentration of 90% or more. The $CO_2$ is taken out and reserved, for example, underground or in a sea bottom.

However, in a conventional pulverized-coal fired boiler designed for stable combustion with oxygen having a concentration of the order of 21%, combustion of coal with oxygen having a concentration of nearly 100% will bring about a problem that the boiler cannot stand the damage due to the extremely hot and fierce combustion with the oxygen.

Thus, dilution of the oxygen with some gas is required to attain the oxygen combustion without substantially changing the design of the conventional pulverized-coal fired boiler with established technical stability.

Conceived in this connection is recirculation of exhaust gas. Specifically, the exhaust gas with high levels of $CO_2$ resulting from the oxygen combustion and downstream of the pulverized-coal fired boiler is used as circulating exhaust gas, and the pulverized coal is burned with mixed gas which is a mixture of oxygen with the circulating exhaust gas. As mentioned in the above, the exhaust gas from the oxygen combustion includes substantially no $N_2$ and theoretically has $CO_2$ with a concentration of 90% or more. Thus, the mixing of oxygen with the circulating exhaust gas ensures safe and stable combustion as in the conventional boiler, and makes it possible to withdraw the concentrated $CO_2$ in the exhaust gas through liquefaction or the like for disposal.

Prior art literatures on oxygen combustion boilers as mentioned in the above are, for example, Patent Literatures 1 and 2.

CITATION LIST

Patent Literature

[Patent Literature 1] JP 03-291406A
[Patent Literature 2] JP 2007-147162A

SUMMARY OF INVENTION

Technical Problems

In an oxygen combustion boiler, which requires an enormous amount of combustion gas for stable combustion of pulverized coal fuel, utilization of recirculating combustion exhaust gas for the oxygen combustion requires continual feed of a large amount of oxygen to the circulating exhaust gas in large quantity for mixing as uniform as possible to produce uniform combustion gas. However, there is a problem that uniform mixing of the oxygen with the circulating exhaust gas is difficult to attain particularly due to a small diffusion coefficient of $CO_2$.

Specifically, it may be conceived in a step of investigation or basic research to mix the oxygen, just upstream of a boiler furnace, with the circulating exhaust gas heated by a preheater so as to feed a resultant mixed gas to the furnace.

However, it is feared that application of such idea to a plant on a commercial scale may result in deteriorated mixing of the oxygen with the circulating exhaust gas mainly because guided distance of the oxygen mixed gas to the boiler furnace is short due to proximity of the preheater to the furnace; $CO_2$ has poor diffusivity; and there is an effect of specific gravity difference in terms of temperature difference resulting from the mixing of the cold oxygen with the hot circulating exhaust gas. Thus, such deteriorated mixing of the oxygen with the circulating exhaust gas may disadvantageously bring about nonuniform combustion in the boiler furnace and thus nonuniform temperatures in the furnace.

The invention was made in view of the above and has its object to provide an oxygen mixer for an oxygen combustion boiler capable of uniformly mixing oxygen with circulating exhaust gas to be fed to the boiler.

Solution to Problems

The invention is directed to an oxygen mixer for an oxygen combustion boiler wherein circulating exhaust gas is heated by a preheater and mixed gas resulting from mixture of oxygen with said circulating exhaust gas is guided to a boiler furnace through a combustion gas duct with bends, said oxygen mixer comprising an oxygen injection nozzle arranged at an upstream one of the bends in said combustion gas duct closest to the preheater, said oxygen injection nozzle having a plurality of injection ports for injecting the oxygen into the circulating exhaust gas.

In the oxygen mixer for the oxygen combustion boiler, it is preferable that said bend closest to said preheater is a horizontally angled bend through which the circulating exhaust gas entered through a bottom of the vertically arranged preheater into and heated in the preheater is passed just after upward discharge of the circulating exhaust gas through an upper discharge port of the preheater.

In the oxygen mixer for the oxygen combustion boiler, it is preferable that said oxygen injection nozzle has the injection ports on a downstream circumferential surface thereof in a direction of flow of the circulating exhaust gas in a range of symmetrically 45° relative to a plane passing through an axis of the oxygen injection nozzle in parallel with the flow of the circulating exhaust gas.

In the oxygen mixer for the oxygen combustion boiler, it is preferable that said oxygen injection nozzle is passed from above into the combustion gas duct and has a lower end which has a bevel declining from upstream to downstream in the direction of flow of the circulating exhaust gas and which has a tip injection port on a downstream surface in the direction of flow of the circulating exhaust gas.

In the oxygen mixer for the oxygen combustion boiler, it is preferable that said oxygen combustion boiler is a pulverized-coal fired boiler by means of oxygen combustion.

Advantageous Effects of Invention

An oxygen mixer for an oxygen combustion boiler according to the invention, which has an oxygen injection nozzle arranged at an upstream bend of a combustion gas duct closest to a preheater and having a plurality of injection ports for injection of oxygen into a circulating gas, can exhibit an excellent effects that the oxygen injected from the plural injection ports is uniformly mixed with the circulating exhaust gas and that the use of length of the combustion gas duct to a boiler furnace is optimized to further improve the mixing, whereby the uniformly mixed gas is fed to the boiler furnace for attainment of uniform combustion in the furnace.

DESCRIPTION OF EMBODIMENT

An embodiment of the invention will be described with reference to the drawings.

Figure 1:
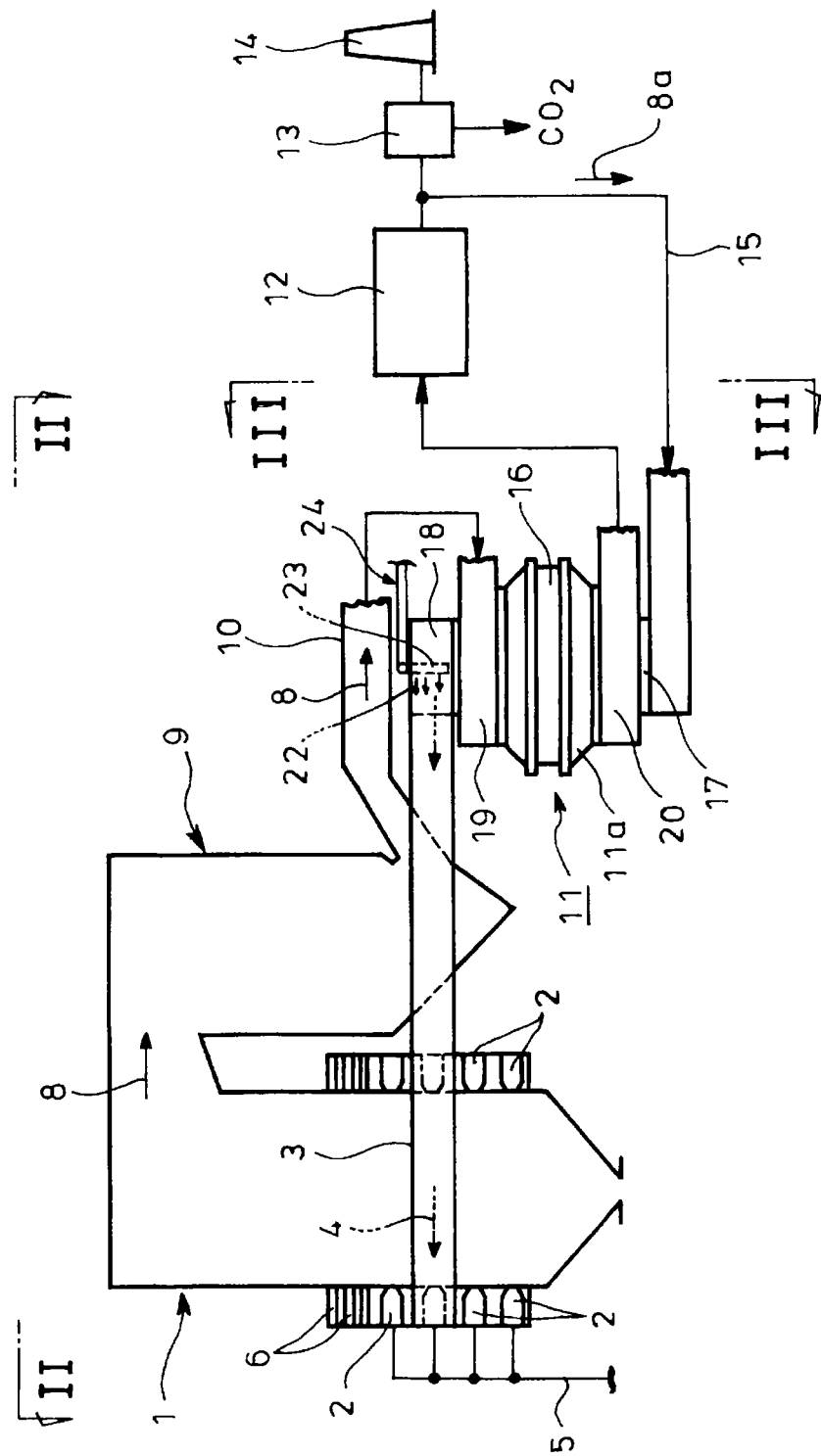
FIG. 1 is a side view showing an embodiment of the invention applied to an oxygen combustion boiler by utilization of a pulverized-coal fired boiler.
Figure 2:
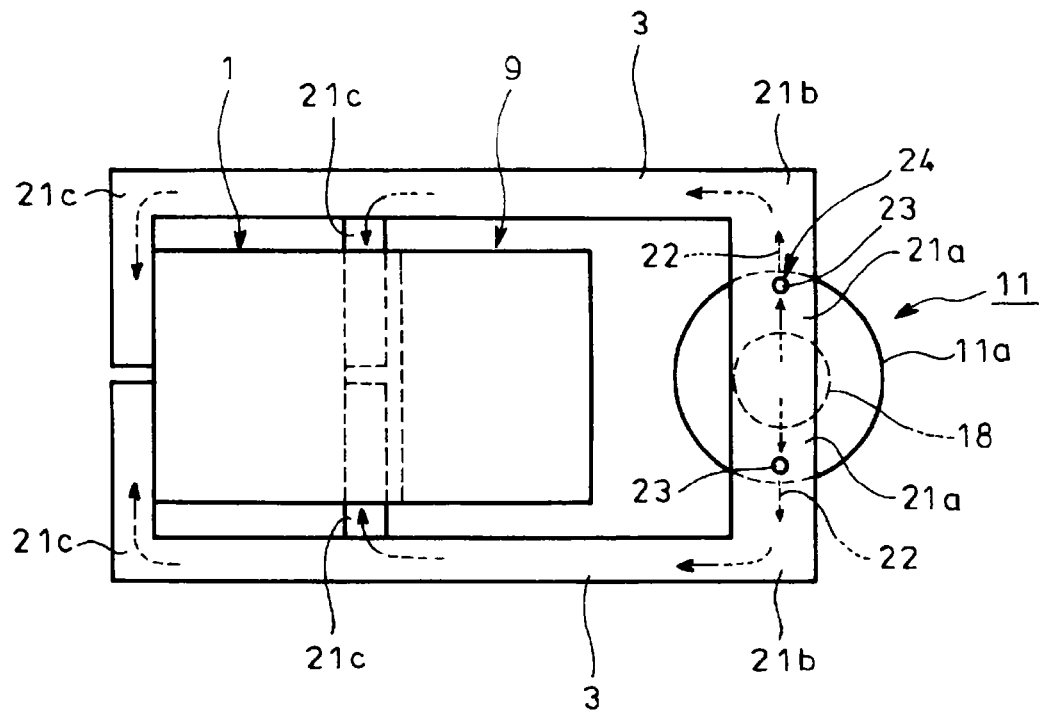
FIG. 2 is a plan view looking in a direction of arrows II in FIG. 1.
Figure 3:
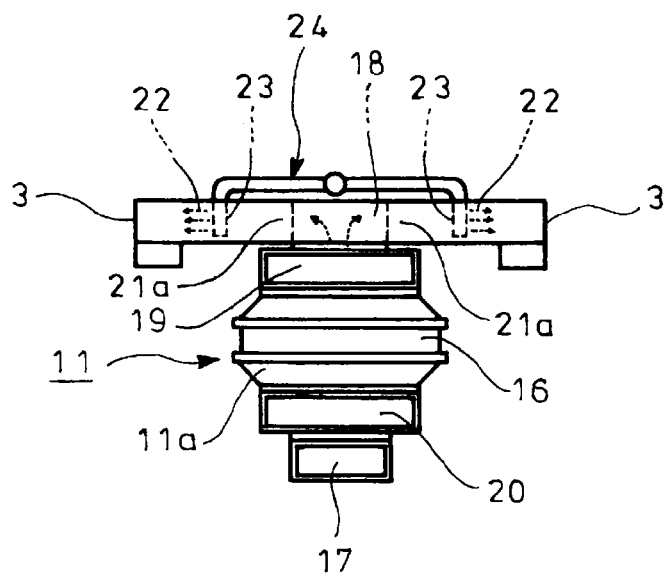
FIG. 3 is a back view looking in a direction of arrows III in FIG. 1.

FIG. 1 is a side view showing the embodiment of the invention applied to an oxygen combustion boiler by utilization of a pulverized-coal fired boiler; FIG. 2 is a plan view looking in the direction of arrows II in FIG. 1; and FIG. 3 is a back view looking in the direction of arrows III in FIG. 1. In FIGS. 1-3, reference numeral 1 denotes a boiler furnace; and 2, burners on the boiler furnace 1. Fed for combustion to the burners 2 are mixed gas 4 through a combustion gas duct 3 and coal fuel pulverized by a coal pulverizer (not shown) and transferred through a pulverized coal pipe 5 by a primary-side circulating exhaust gas. In FIG. 1, reference numeral 6 designates over air ports above the burners 2, the over air ports being fed only with the mixed gas 4.

Exhaust gas 8 burned in the boiler furnace 1 is guided through an upper passage to a heat recovery area or rear heat transfer portion 9 for heating or overheating of water and steam by way of a heat exchanger (not shown) arranged in the heat recovery area 9, the exhaust gas being then discharged through an exhaust gas duct 10 at a bottom of heat recovery area 9. The exhaust gas 8 from the heat recovery area 9 is guided to a preheater 11 and further to an exhaust gas processor 12 for emission control. Then, with $CO_2$ being separated by a $CO_2$ separator 13, the exhaust gas is guided to a stack 14.

The preheater 11 serves to enhance a temperature of circulating exhaust gas 8a taken out through a circulating exhaust gas duct 15 from the low-temperatured exhaust gas 8 downstream of the exhaust gas processor 12, in heat exchange with the high-temperatured exhaust gas 8 from the heat recovery area 9. The preheater 11 illustrated is a vertically arranged rotary preheater 11a with a horizontally rotating heat accumulator 16, the low-temperatured circulating exhaust gas 8a from the circulating exhaust gas duct 15 being guided through a bottom feed port 17 into the rotary preheater 11a, being passed through a portion of the heat accumulator 16 and being discharged through an upper discharge port 18. The high-temperatured exhaust gas 8 from the heat recovery area 9 through an exhaust gas duct 10 is guided through an upper, side inlet 19 into the rotary preheater 11a, is passed through the other portion of the heat accumulator 16 and is discharged through a lower, side outlet 20 of the rotary preheater 11a to downstream. In the rotary preheater 11a, the circulating exhaust gas 8a is heated through its passage via a rotatively moved portion of the heat accumulator 16 having been heated by the passage of the high-temperatured exhaust gas 8.

An upper discharge port 18 of the rotary preheater 11a is connected with a combustion gas duct 3 branched into two horizontally and laterally outwardly (directions above and below along the sheet of FIG. 2) of the boiler furnace 1. Thus, an upstream portion of the combustion gas duct 3 closest to the preheater 11 is formed with 90° angled bends 21a. Further, each of the laterally extending portions of the combustion gas duct 3 has, as shown in FIG. 2, a horizontal bend 21b angled to a direction along a lateral side surface of the boiler furnace 1 to detour laterally outside of the heat recovery area 9 and then bent inwardly by bends 21c and connected to the burners 2 and over air ports 6 on front and back surfaces of the boiler furnace 1.

In the oxygen combustion boiler, oxygen is to be mixed with the circulating exhaust gas 8a. To this end, an oxygen mixer 24 is provided for the upstream bends 21a of the combustion gas duct 3 closest to the rotary preheater 11a and has oxygen injection nozzles 23 extending from above and vertically into the horizontal extending duct 3 to inject oxygen 22 into the circulating exhaust gas 8a.

In the oxygen combustion boiler, in order to enhance the combustion efficiency of the boiler furnace 1, the circulating exhaust gas 8a is preheated by the rotary preheater 11a in heat exchange with the exhaust gas 8; in this case, mixing of oxygen upstream of the rotary preheater 11a would disadvantageously bring about increase in oxygen loss due to the rotary preheater 11a with a low sealability. Thus, it is preferable that the mixing of the oxygen is downstream of the rotary preheater 11a. Moreover, in order to enhance the mixing of the circulating exhaust gas 8a with the oxygen 22 in the combustion gas duct 3, it is preferable that the oxygen mixer 24 is arranged upstreammost of the combustion gas duct 3 closest to the rotary preheater 11a for the purpose of making a distance for mixing as long as possible. Thus, though the position of the oxygen mixer 24 may be at the bends 21b or 21c, it is most preferable that the oxygen mixer is arranged at the upstream bends 21 closest to the rotary preheater 11a.

Figure 4:
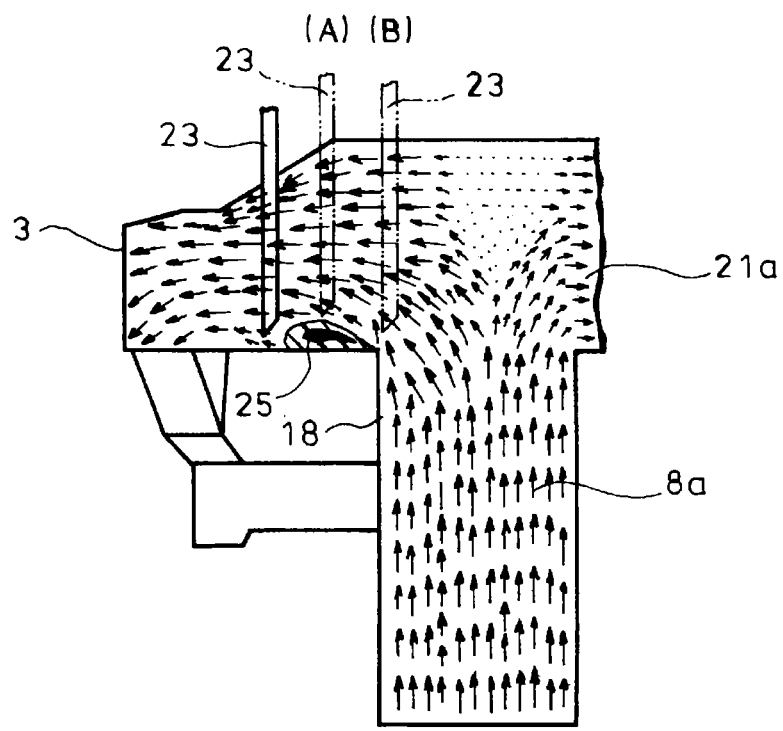
FIG. 4 is a flow velocity distribution diagram in simulated flow analysis of a circulating exhaust gas discharged through an upper discharge port of a preheater through a bend to a combustion gas duct.
Figure 5:
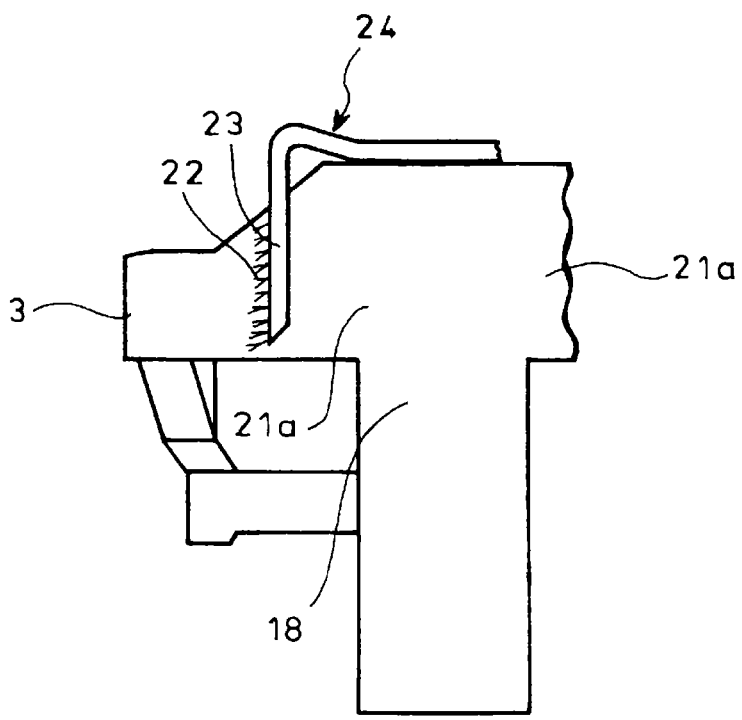
FIG. 5 is a side view showing an example of the oxygen injection nozzle arranged at the bend in FIG. 4.

The inventors conducted simulated flow analysis of the circulating exhaust gas 8a discharged through the upper discharge port 18 of the preheater 11 and guided through the bends 21a to the combustion gas duct 3; a flow velocity distribution thereof is shown in FIG. 4 and a structure used for the simulated flow analysis is shown in FIG. 5. While FIGS. 1-3 show a system using a rotary preheater 11a for use with a common or general boiler plant, a model for the simulation used in FIG. 4 and the structure shown in FIG. 5 has been prepared under the design for a specific plant, and therefore the illustrated shapes of the preheater 11 and of the combustion gas duct 3 are more or less different in detail from those in FIGS. 1-3. However, the alignment of the combustion gas ducts 3 is designed under a consistent concept so that the combustion gas flow may be analogous although shape differences in detail are to be considered. Thus, from the result of study shown in FIG. 4, an oxygen mixing status in the common or general boiler shown in FIGS. 1-3 may be analogized.

In the simulation shown in FIG. 4, it is confirmed that the circulating exhaust gas 8a discharged through the upper discharge port 18 of the preheater 11 and horizontally bent by the bend 21a shown in FIG. 5 brings about an eddy 25 inside and downstream of the bend 21a. Such eddy 25 causes a flow directed upstream which is reverse to the flow of the circulating exhaust gas 8a.

Feed of oxygen to such an eddy 25 would increase a concentration of the oxygen at the eddy 25 where the flow is congested, failing in uniform mixing.

Figure 6:
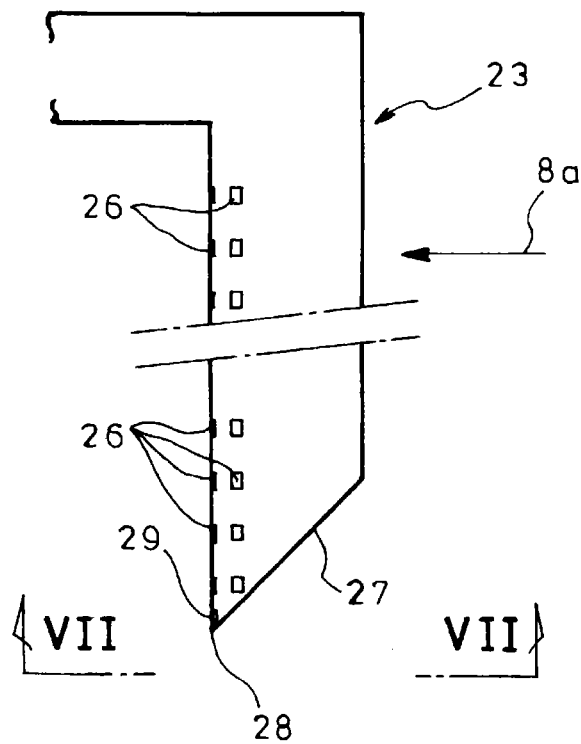
FIG. 6 is a side view showing an example of the oxygen injection nozzle.
Figure 7:
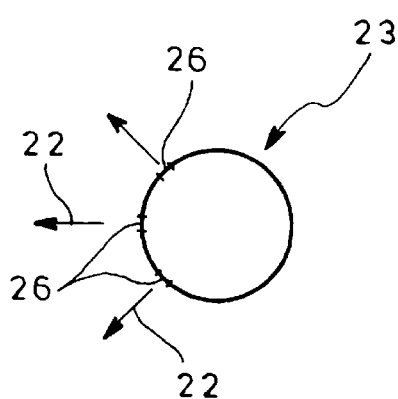
FIG. 7 is a bottom view looking in a direction of arrows VII in FIG. 6.

Thus, the oxygen injection nozzle 23 is arranged upstreammost of the combustion gas duct 3 closest to the rotary preheater 11a. In this case, the oxygen injection nozzle 23 is arranged such that all the injection ports 26 of the oxygen injection nozzle 23 shown in FIGS. 6 and 7 are at positions off the eddy 25. FIGS. 4 and 5 show a case where the oxygen injection nozzle 23 is arranged just downstream of the eddy 25; in this case, the oxygen injection nozzle 23 is arranged such that all of the injection ports 26 are open just downstream of the eddy 25 for stable flow and off the positions where the flow velocity is reduced to for example ½ or less relative to an average flow velocity in the combustion gas duct 3. Alternatively, as shown in FIG. 4 at (A), the oxygen injection nozzle 23 may be arranged above the eddy 25 and may be of a length short of the eddy 25. Alternatively, as shown in FIG. 4 at (B), the oxygen injection nozzle 23 may be arranged at a position upstream of and not affected by the eddy 25.

FIGS. 6 and 7 show an example of the oxygen injection nozzle 23 which is cylindrical and is formed with a plurality of injection ports 26 for injection of oxygen downstream in the direction of flow of the circulating exhaust gas 8a. In the FIG. 7 example, the injection ports 26 are formed on a downstream peripheral surface of the oxygen injection nozzle 23 in the direction of flow of the circulating exhaust gas 8a, symmetrically with an angle of 45° to a plane passing through an axis of the nozzle in parallel with the flow of the circulating exhaust gas.

Further, the lower end of the oxygen injection nozzle 23 is formed with a bevel 27 which has an acute-angled tip 28 and which is high and low in height upstream and downstream of the flow of the circulating exhaust gas 8a, respectively. Furthermore, the acute-angled tip 28 has a surface downstream of the flow of the circulating exhaust gas 8a which is formed with a tip injection port 29.

In the oxygen injection nozzle 23, the injection velocity of the oxygen 22 is 20 m/s or more, preferably 30 m/s or more, and further preferably 40 m/s or more provided pressure loss in an oxygen supply system is allowable. On the other hand, the condition of substantially exceeding 40 m/s is not preferable in consideration of the pressure loss in the oxygen feed system and wear characteristics of the nozzle material. Thus, as an upper limit of the injection velocity of the oxygen 22, a range of 40-50 m/s is used as a target.

Figure 8:
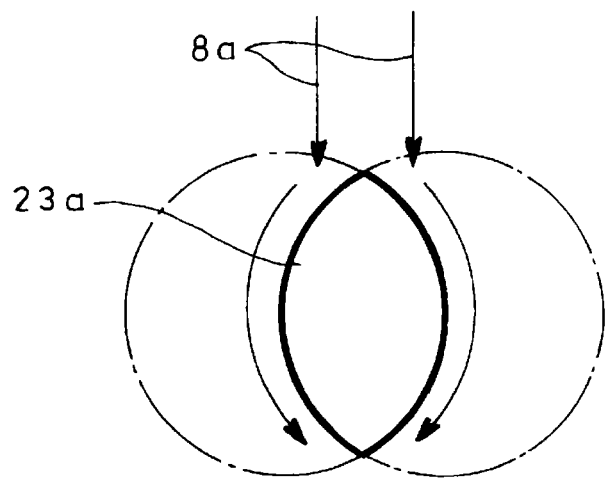
FIG. 8 is a bottom view of the oxygen injection nozzle shaped so as to cause no downstream eddy by the circulating exhaust gas.
Figure 9:
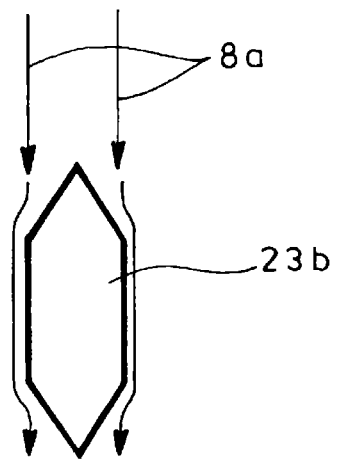
FIG. 9 is a bottom view of a further example of the oxygen injection nozzle in FIG. 8.

FIGS. 8 and 9 show examples of different bottom shapes of the oxygen injection nozzle 23. FIG. 8 is a case of a flattened arc shape nozzle 23 defined by arcs of two circles intersected substantially at their radii; and FIG. 9 is a case of a flattened hexagonal nozzle 23b. In either cases, no eddies are produced downstream by the flow of the circulating exhaust gas 8a as shown by arrows upstream of the flattened nozzle 23a or 23b.

Next, a mode of operation of the above embodiment will be described.

In the oxygen combustion boiler by utilization of the pulverized-coal fired boiler shown in FIGS. 1-3, the low-temperatured exhaust gas 8 downstream of the exhaust gas processor 12 is taken out as the circulating exhaust gas 8a through the circulating exhaust gas duct 15. The circulating exhaust gas 8a taken out is guided to the rotary preheater 11a and is heat exchanged with the high-temperatured circulating exhaust gas 8 guided from the heat recovery area 9 through the exhaust gas duct 10 to thereby enhance the temperature of the circulating exhaust gas 8a, the thus temperature-elevated circulating exhaust gas 8a being fed through the combustion gas duct 3 to the boiler furnace 1.

In this connection, the oxygen injection nozzles 23 are arranged such that, as shown in FIGS. 4 and 5, all the injection ports 26 are opened at the upstream bends 21a closest to the rotary preheater 11a in the combustion gas duct 3 at positions off the eddy 25 produced in the circulating exhaust gas 8a by the bends 21a, so that the oxygen 22 is injected through the plural injection ports 26 on the injection nozzles 23 and is mixed with the circulating exhaust gas 8a.

As shown in FIGS. 6 and 7, the injection ports 26 are formed on the downstream peripheral surface of the oxygen injection nozzle 23 in a range of 90°, so that the oxygen 22 injected through the injection ports 26 is effectively mixed with the circulating exhaust gas 8a with causing no eddy. It is preferable that the oxygen injection nozzle 23 is a flattened nozzle 23a or 23b as shown in FIGS. 8 and 9 for hardness of eddy formation.

Thus, the oxygen 22 injected through the plural injection ports 26 on the oxygen injection nozzle 23 at the upstream bends 21a closest to the rotary preheater 11a in the combustion gas duct 3 is uniformly mixed with the circulating exhaust gas 8a. Then, the mixed gas 4 is further facilitated in mixing due to long in distance of the combustion gas duct 3 between the bend 21a and the boiler furnace 1 and due to passage through the other bends 21b and 21c and is supplied to the burners 2 and over air ports 6 on the boiler furnace 1. As a result, the pulverized coal fed through the pulverized coal pipe 5 is satisfactorily burned with the uniformly mixed gas 4. The oxygen injection nozzle 23 constructed as mentioned in the above hardly requires increase in power of the blower for circulation of the circulating exhaust gas 8a.

Minute particles such as fly ash, which are entrained in the circulating exhaust gas 8a, may intrude into the oxygen injection nozzle 23 when the supply of the oxygen 22 by the oxygen injection nozzle 23 is stopped. However, the lower end of the oxygen injection nozzle 23 is formed with the bevel 27 provided with the acute-angled tip 28 which in turn has the tip injection port 29 on the surface downstream of the flow of the circulating exhaust gas 8*a*, which contributes to easy injection of the intruding minute particles in the oxygen injection nozzle 23 through the tip injection port 29.

In the above embodiment, illustrated is the preheater 11 in the form of the rotary preheater 11*a*; however, application may be made to a tube-shaped preheater with bends angled horizontally just after upward discharge of the circulating exhaust gas through the upper discharge port. It is to be understood that an oxygen mixer for an oxygen combustion furnace of the invention is not limited to the above embodiment and that various changes and modifications may be made without departing from the scope of the invention.

REFERENCE SIGNS LIST

1 boiler furnace
3 combustion gas duct
4 mixed gas
8 exhaust gas
8*a* circulating exhaust gas
11 preheater
11*a* rotary preheater
18 upper discharge port
21*a*, 21*b* and 21*c* bends
22 oxygen
23 oxygen injection nozzle
24 oxygen mixer
25 eddy
26 injection port
27 bevel
29 tip injection port

INDUSTRIAL APPLICABILITY

In an oxygen mixer for an oxygen combustion boiler of the invention, oxygen can be uniformly mixed with circulating exhaust gas fed to the oxygen combustion boiler.

The invention claimed is:

1. An oxygen mixer for an oxygen combustion boiler wherein circulating exhaust gas is heated by a preheater and mixed gas resulting from mixture of oxygen with said circulating exhaust gas is guided to a boiler furnace through a combustion gas duct with bends, said oxygen mixer comprising:
    an oxygen injection nozzle arranged at an upstream one of the bends in said combustion gas duct closest to the preheater, said oxygen injection nozzle having a plurality of injection ports for injecting the oxygen into the circulating exhaust gas,
    wherein said oxygen injection nozzle is passed from above into the combustion gas duct,
    wherein all the injection ports of said oxygen injection nozzle are opened at positions clear of any eddy produced by the circulating exhaust gas due to the bends of the combustion gas duct, and
    wherein a tip injection port is arranged on a downstream end of the oxygen injection nozzle to inject minute particles intruded in the oxygen injection nozzle outside of the oxygen injection nozzle.

2. The oxygen mixer for the oxygen combustion boiler as claimed in claim 1, wherein said bend closest to said preheater is a horizontally angled bend through which the circulating exhaust gas entered through a bottom of the vertically arranged preheater into and heated in the preheater is passed just after upward discharge of the circulating exhaust gas through an upper discharge port of the preheater.

3. The oxygen mixer for the oxygen combustion boiler as claimed in claim 1, wherein said oxygen injection nozzle has the injection ports on a downstream circumferential surface thereof in a direction of flow of the circulating exhaust gas in a range of symmetrically 45° relative to a plane passing through an axis of the oxygen injection nozzle in parallel with the flow of the circulating exhaust gas.

4. The oxygen mixer for the oxygen combustion boiler as claimed in claim 1, wherein said oxygen combustion boiler is a pulverized-coal fired boiler by means of oxygen combustion.

5. The oxygen mixer for the oxygen combustion boiler as claimed in claim 1, wherein a lower end of the oxygen injection nozzle has a bevel declining from upstream to downstream in the direction of flow of the circulating exhaust gas, and the tip injection port is provided on the lower end of the oxygen injection nozzle.

6. The oxygen mixer for the oxygen combustion boiler as claimed in claim 1, wherein the oxygen injection nozzle is arranged above the eddy.

7. The oxygen mixer for the oxygen combustion boiler as claimed in claim 1, wherein the oxygen injection nozzle is arranged upstream of the eddy.

* * * * *